(12) United States Patent
Tseng

(10) Patent No.: US 9,981,350 B2
(45) Date of Patent: May 29, 2018

(54) WELDING FLUX USED FOR AUSTENITIC STAINLESS STEEL

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 315 days.

(21) Appl. No.: 15/061,682

(22) Filed: Mar. 4, 2016

(65) Prior Publication Data

US 2017/0173744 A1   Jun. 22, 2017

(30) Foreign Application Priority Data

Dec. 16, 2015   (TW) .............................. 104142328 A

(51) Int. Cl.
| | |
|---|---|
| *B23K 35/362* | (2006.01) |
| *B23K 35/02* | (2006.01) |
| *B23K 35/36* | (2006.01) |

(52) U.S. Cl.
CPC ........ *B23K 35/362* (2013.01); *B23K 35/0261* (2013.01); *B23K 35/0266* (2013.01); *B23K 35/3601* (2013.01); *B23K 35/3607* (2013.01)

(58) Field of Classification Search
CPC .................................................... B23K 35/362
See application file for complete search history.

(56) References Cited

U.S. PATENT DOCUMENTS

| | | | | |
|---|---|---|---|---|
| 3,826,695 | A  * | 7/1974 | Leicher .............. | B23K 35/3607 148/26 |
| 8,394,206 | B2 * | 3/2013 | Tseng ................... | B23K 35/362 148/23 |
| 2005/0199317 | A1* | 9/2005 | Chou ..................... | B23K 35/34 148/26 |
| 2010/0288397 | A1* | 11/2010 | Tseng ..................... | B23K 35/34 148/26 |
| 2015/0027993 | A1* | 1/2015 | Bruck ..................... | B23K 25/00 219/73.2 |
| 2016/0167178 | A1* | 6/2016 | Tseng ................. | B23K 35/3602 148/24 |
| 2017/0173744 | A1* | 6/2017 | Tseng ................... | B23K 35/362 |

* cited by examiner

*Primary Examiner* — Christopher Kessler
(74) *Attorney, Agent, or Firm* — WPAT, PC

(57) ABSTRACT

The present disclosure provides a welding flux used for austenitic stainless steel, which includes 20-40 wt. % SiC, 20-30 wt. % $SiO_2$, 15-25 wt. % $MoO_3$, 2-15 wt. % $TiO_2$, 2-10 wt. % NiO, and 1-5 wt. % MgO. As such, the welding flux forms a soundness weld with high D/W ratio and surface hardness.

2 Claims, 4 Drawing Sheets

WELDING FLUX USED FOR AUSTENITIC STAINLESS STEEL

CROSS REFERENCE TO RELATED APPLICATIONS

The application claims the benefit of Taiwan application serial No. 104142328, filed on Dec. 16, 2015, and the subject matter of which is incorporated herein by reference.

BACKGROUND OF THE INVENTION

1. Field of the Invention

The present invention generally relates to a welding flux and, more particularly, to a welding flux used for austenitic stainless steel.

2. Description of the Related Art

Stainless steel consists essentially of iron (Fe). Specifically, stainless steel is high-alloy steel containing basic elements such as carbon (C), silicon (Si), manganese (Mn), phosphor (P) and sulfur (S), and further containing alloying elements such as chromium (Cr), nickel (Ni), molybdenum (Mo), nitrogen (N), titanium (Ti) and niobium (Nb). Accordingly, the content of Cr in stainless steel must reach a weight percentage of at least 12 wt. % for forming a compact, continuous passive layer of chromium(III) oxide ($Cr_2O_3$). Since Cr atom is more active than Fe atom and reacts easily with oxygen (O) atom in the atmosphere or environment to form a thin layer of $Cr_2O_3$ on the surface of the stainless steel, the corrosion factors in the atmosphere or environment are thus prevented from diffusing into the interior of the stainless steel. Furthermore, since stainless steel is provided with excellent resistances of corrosion and abrasion, mechanical strength, formability and weldability, it can be widely utilized in livelihood industry, food industry, pharmaceutical industry, petrochemical industry, nuclear industry, aerospace industry, paper industry, shipbuilding industry and medical device industry. Generally, stainless steel can be classified based on two criteria. Firstly, it can be sorted according to the alloy elements contained therein into two major groups, which are Fe—Cr stainless steel and Fe—Cr—Ni stainless steel. Secondly, it can be sorted according to the microstructure under room temperature into five major groups, which are ferritic, austenitic, martensitic, duplex and precipitation hardening stainless steel. Specifically, austenitic stainless steel belongs to Fe—Cr—Ni stainless steel, and is non-magnetic. The microstructure of austenitic stainless steel is not affected by heating temperature; hence, its mechanical strength cannot be enhanced by heat treatment. Austenitic stainless steel possesses not only excellent formability, weldability and general corrosion resistance, but also excellent pitting resistance. Austenitic stainless steel is widely used in tableware, medical device and kitchenware. Compared to martensitic stainless steel, austenitic stainless steel has a good corrosion resistance; however its abrasion resistance is not as well as martensitic stainless steel.

Tungsten inner gas (TIG) welding is a high-quality arc welding technique. The arc welding of austenitic stainless steel in practice is mainly performed using TIG welding. The TIG welding is performed under a protective atmosphere of an inner gas (e.g. argon gas or helium gas), with an electric arc generated by a tungsten electrode as a welding heat source for melting the joint of two workpieces. The melted parts of the workpieces are rapidly cooled down and then solidified, thus joining the two workpieces together. However, since the power density of TIG welding heat source is not high enough, the joint penetration achievable in single-pass operation without edge preparation is less than 3 mm, and thus the TIG welding is not cost-efficient to join thick section workpieces.

In the case that welding of thick section workpieces (with a thickness more than 3 mm) is required, a conventional welding flux can be applied to the joint of two workpieces, such that the conventional welding flux will be melted to form a molten pool at the joint of the two workpieces. The molten pool is then cooled down to room temperature, resulting in a weld which tightly joins two workpieces. A conventional welding flux includes titanium dioxide ($TiO_2$), silicon dioxide ($SiO_2$), $Cr_2O_3$, nickel oxide (NiO) and copper oxide (CuO), which is able to form a deep, narrow weld and suitable for welding of thick workpieces. However, the conventional welding flux is provided with weak surface hardness, which is insufficient for a situation where high abrasion resistance is required.

SUMMARY OF THE INVENTION

It is therefore the objective of this invention to overcome the above mentioned problems, providing a welding flux used for austenitic stainless steel which forms a weld with improved depth-to-width (D/W) ratio and surface hardness.

The present disclosure provides a welding flux used for the austenitic stainless steel, which includes 20-40 wt. % silicon carbide (SiC), 20-30 wt. % silicon dioxide ($SiO_2$), 15-25 wt. % molybdenum trioxide ($MoO_3$), 2-15 wt. % $TiO_2$, 2-10 wt. % nickel oxide (NiO) and 1-5 wt. % magnesium oxide (MgO).

In a form shown, the silicon carbide (SiC) contained in the welding flux used for austenitic stainless steel is in the form of particles, with a size of each of said particles is 20-40 nm.

Since the welding flux used for austenitic stainless steel of the present disclosure contains SiC in combination with $SiO_2$, $MoO_3$, $TiO_2$, NiO and MgO, the D/W ratio and surface hardness of the weldresultant weld can be consequently improved, thus reducing angular deformation of the weldment and enhancing abrasion resistance of the weld.

Since SiC, $SiO_2$, $MoO_3$, $TiO_2$, NiO and MgO contained in the welding flux used for austenitic stainless steel are set at the certain proportion, the surface hardness of the weld can be significantly increased while maintaining the joint penetration and corrosion resistance of the weld, thus improving the welding quality.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
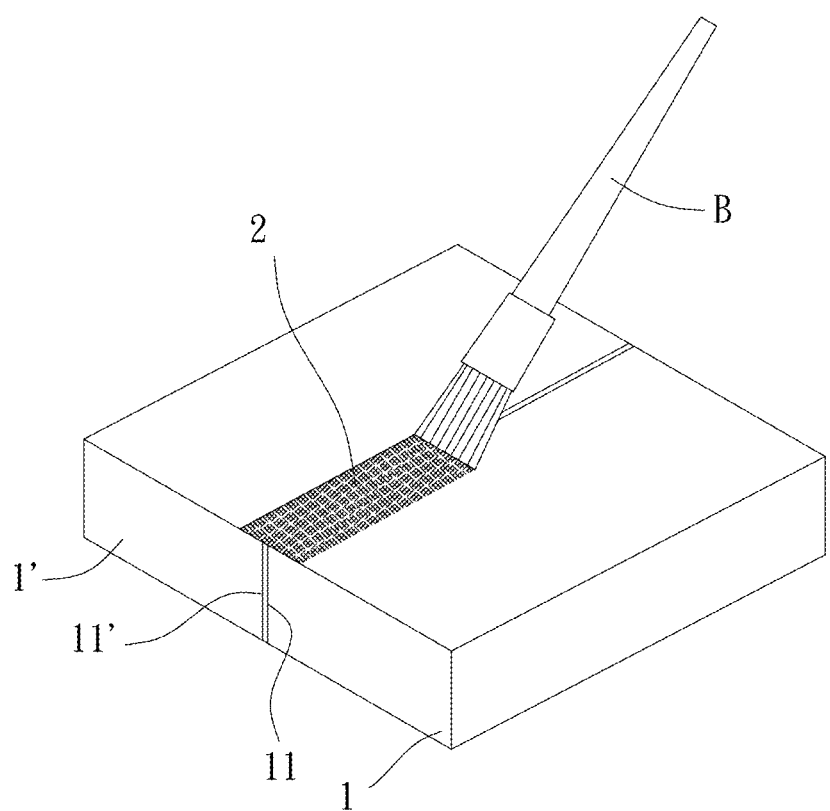
FIG. 1 illustrates the application of the welding flux used for austenitic stainless steel of the present disclosure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The austenitic stainless steel can be, but not thus limited to, AISI 301 series, AISI 302 series, AISI 303 series, AISI 304 series, AISI 309 series, AISI 310 series, AISI 312 series, AISI 316 series, AISI 347 series, etc.

A welding flux used for austenitic stainless steel of the present disclosure includes silicon carbide (SiC), silicon dioxide ($SiO_2$), molybdenum trioxide ($MoO_3$), titanium dioxide ($TiO_2$), nickel oxide (NiO) and magnesium oxide (MgO). During welding, a heat source is provided to a joint of two workpieces, so as to melt the welding flux used for austenitic stainless steel into a molten pool between these two workpieces. The molten pool forms a weld after cooling, such that the two workpieces are joined together to form a weldment, thus finishing the welding operation. Due to utilizing of the welding flux used for austenitic stainless steel, a weld is formed with a high surface hardness, resulting in improved abrasion resistance.

Specifically, the welding flux used for austenitic stainless steel includes 20-40 wt. % SiC. During welding, SiC tends to flow to the surface of the weld, enhancing the surface hardness of the resultant weld. Hence, abrasion resistance of the weld is consequently improved. Meanwhile, since SiC mainly distributes on surface of the weld, fracture toughness of the weld is not affected; hence brittle fracture of the weldment does not occur easily. However, excess of SiC may reduce the joint penetration, and may also adversely affect corrosion resistance of the weld. Based on the above concerns, the content of SiC in the welding flux used for austenitic stainless steel should be set at a proper ratio to the other components, such that the surface hardness of the weld can be improver without affecting the joint penetration and corrosion resistance of the resultant weld.

Accordingly, the welding flux used for austenitic stainless steel further includes 20-30 wt. % $SiO_2$ for sufficiently increasing depth and reducing width of the weld; 25-30 wt. % $MoO_3$ for further improving depth of the weld; 5-10 wt. % $TiO_2$ for further improving depth and corrosion resistance of the weld; 2-10 wt. % NiO for maintaining weld depth and further improving corrosion resistance of the weld; and 1-5 wt. % MgO for further enhancing the surface hardness of the weld.

Since welding flux used for austenitic stainless steel of the present disclosure includes SiC in combination with $SiO_2$, $MoO_3$, $TiO_2$, NiO and MgO, and since all the components are set at a certain proportion, the surface hardness of the weld formed thereby can be enhanced without affecting the joint penetration and corrosion resistance of the resultant weld.

Furthermore, SiC used in the welding flux used for austenitic stainless steel can be in the form of powder in nanoscale, such as a SiC powder having a particle size of 20-40 nm. In this way, SiC powder can be properly mixed with other components. Hence, the surface hardness of the weld can be improved while maintaining the joint penetration.

The welding flux used for austenitic stainless steel of the present disclosure can be utilized in any known welding process, such as TIG welding. The welding flux used for austenitic stainless steel can be uniformly applied on the surfaces of the workpieces before welding, with details provided below.

With references to FIG. 1, before performing the welding operation, the respective edges 11, 11' of two workpieces 1, 1' can be abutted with each other, and the welding flux used for austenitic stainless steel 2 can be applied by a brush B to the joint of the two workpieces 1, 1'. The welding flux used for austenitic stainless steel 2 can be dispersed in a solution or a gel, such as dispersed in ethanol to form a paste-like slurry, for uniformly applying the welding flux used for austenitic stainless steel 2 to the joint of the two workpieces 1, 1'. The welding operation can be carried afterwards.

Figure 2A:
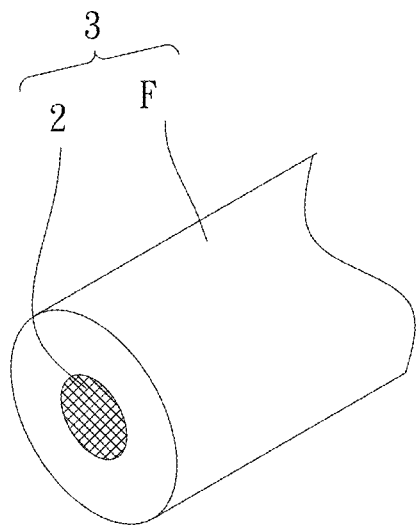
FIG. 2A is a perspective view of a flux-cored wire utilizing the welding flux used for austenitic stainless steel of the present disclosure.
Figure 2B:
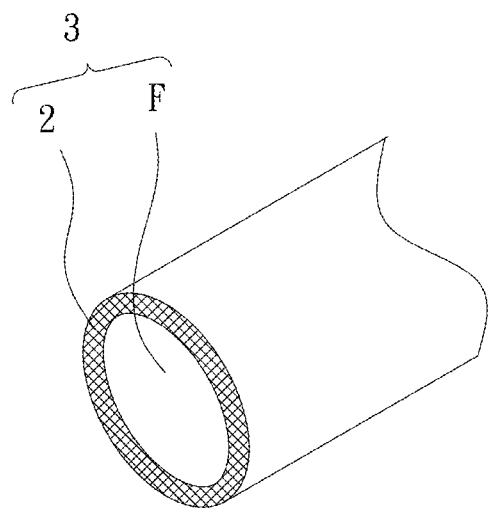
FIG. 2B is a perspective view of a flux-coated rod utilizing the welding flux used for austenitic stainless steel of the present disclosure.
Figure 2C:
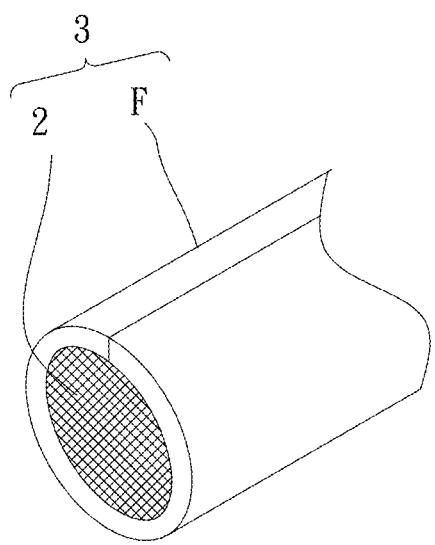
FIG. 2C is a perspective view of another flux-cored wire utilizing the welding flux used for austenitic stainless steel of the present disclosure.
Figure 2D:
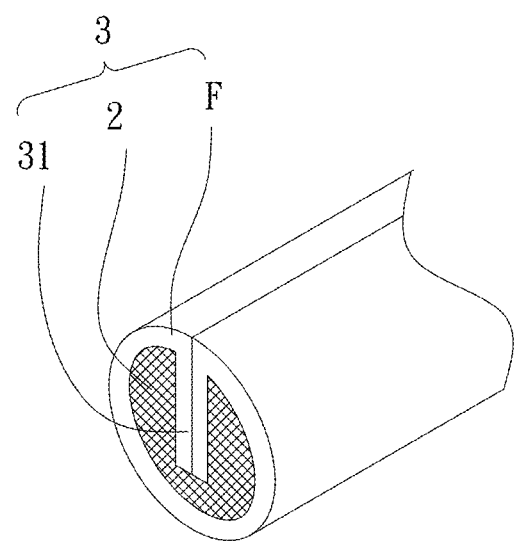
FIG. 2D is a perspective view of still another flux-cored wire utilizing the welding flux used for austenitic stainless steel of the present disclosure.

With further references to FIGS. 2A, 2B, 2C and 2D, the welding flux used for austenitic stainless steel 2 can be joined with a filler metal "F" to produce a flux-coated rod (or a flux-cored wire) 3, which is used in the TIG welding. The flux-coated rod (or flux-cored wire) 3 can be produced by filling the welding flux used for austenitic stainless steel 2 in the hollow, cylindrical filler metal "F" as shown in FIG. 2A; or by coating the welding flux used for austenitic stainless steel 2 around the cylindrical filler metal "F" as shown in FIG. 2B. Alternatively, a sheet of filler metal "F" is rolled into an annular form and envelopes the welding flux used for austenitic stainless steel 2 as shown in FIG. 2C. Furthermore, a sheet of filler metal "F" is rolled into an annular form and envelopes the welding flux used for austenitic stainless steel 2, with a filler metal "F" including at least one inwardly extending end 31 received in the welding flux used for austenitic stainless steel 2 as shown in FIG. 2D. Providing with the flux-coated rod (or flux-cored wire) 3, the welding flux used for austenitic stainless steel can be utilized in an automatic operation, thus significantly improving production efficiency.

Figure 3A:
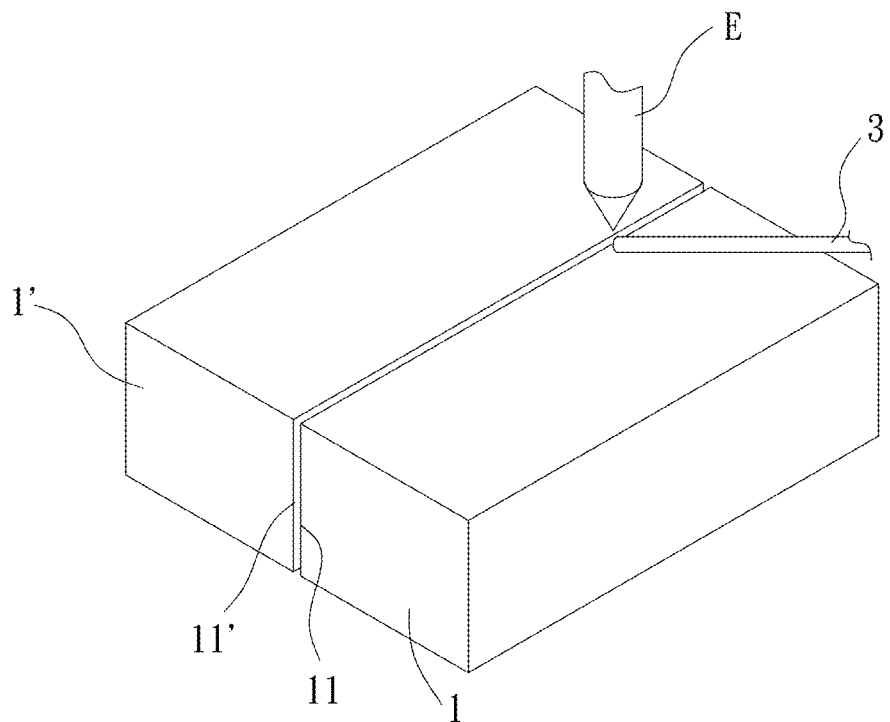
FIG. 3A illustrates a welding operation using the flux-cored wire or flux-coated rod utilizing the welding flux used for austenitic stainless steel of the present disclosure.
Figure 3B:
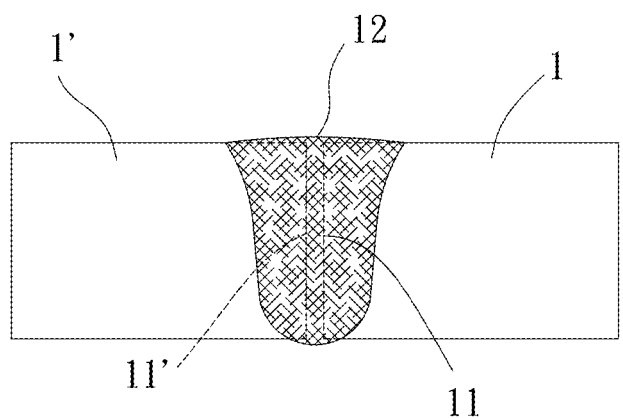
FIG. 3B is a cross sectional view of a weld formed by the flux-cored wire or flux-coated rod described above.
Figure 4:
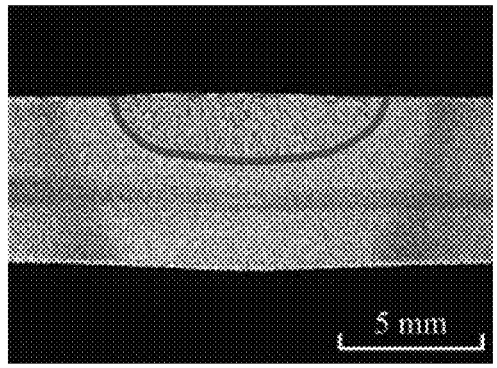
FIG. 4 is a cross sectional view of the weld of Sample A1.
Figure 5:
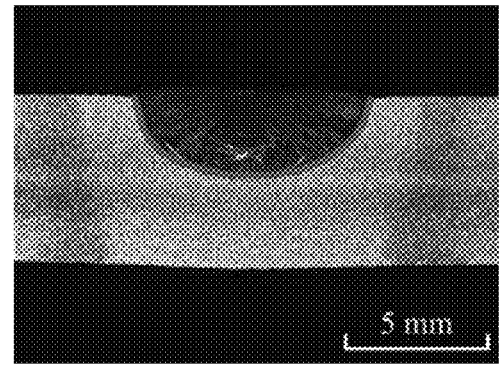
FIG. 5 is a cross sectional view of the weld of Sample A2.
Figure 6:
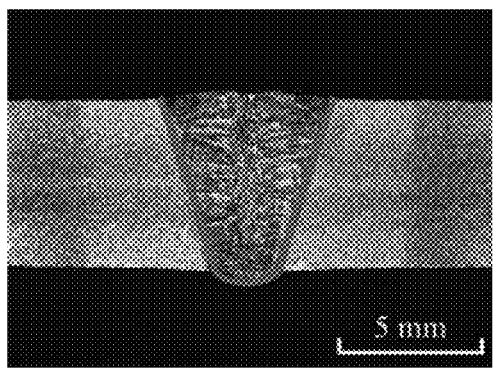
FIG. 6 is a cross sectional view of the weld of Sample A3.
Figure 7:
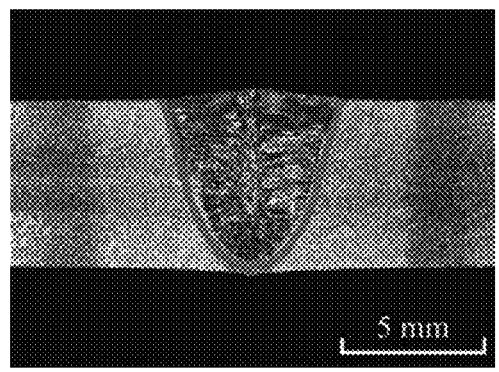
FIG. 7 is a cross sectional view of the weld of Sample A4.

With references to FIG. 3A, the flux-coated rod (or flux-cored wire) can be utilized with a tungsten electrode "E" for providing a heat source, such that the filler metal "F" and the welding flux used for austenitic stainless steel 2 melt together to form the molten pool between the edges 11, 11' of the two workpieces 1, 1'. The molten pool is cooled down to room temperature, resulting in a soundness weld. As shown in FIG. 3B, a deep, narrow weld 12 is thus formed with a high D/W ratio.

To validate that the welding flux used for austenitic stainless steel of the present disclosure is certainly suitable for welding austenitic stainless steel and can improve the surface hardness of the weld without affecting the joint penetration and corrosion resistance of the resultant weld, the following experiments are carried out.

(A) The Effect of the Content of SiC

In the series of experiments, the compositions of the welding fluxes of Samples A1-A4 are listed in Table 1. Sample A1 represents welding without welding flux, and Sample A2 represents welding using 100% SiC as the welding flux. Sample A3 uses a conventional welding flux, while Sample A4 represents the welding flux used for austenitic stainless steel of the present disclosure.

TABLE 1

The composition of each welding flux in Samples A1-A4

| Sample | wt. % of each component | | | | | |
|---|---|---|---|---|---|---|
| No. | SiC | SiO$_2$ | MoO$_3$ | TiO$_2$ | NiO | MgO |
| A1 | 0 | 0 | 0 | 0 | 0 | 0 |
| A2 | 100 | 0 | 0 | 0 | 0 | 0 |
| A3 | 0 | 35 | 30 | 20 | 10 | 5 |
| A4 | 25 | 30 | 20 | 15 | 5 | 5 |

In this experiment, AISI 304 stainless steel is cut by a band-sawing machine into specimens with 150×150 mm dimensions, for an 6 mm thick plate. Single-pass, autogenous TIG welding is carried out using semi-automatic equipment, in which a welding torch is moved along the centerline of the specimen to produce a bead-on-plate weld. The arc length is maintained at 2 mm. The welding current and travel speed are selected to be at 180 A and 140 mm/min, respectively. The shielding gas is high-purity grade argon gas. Following welding, the specimens are cut at a section perpendicular to the longitudinal axis of a weld. All samples are then mounted, ground, polished and etched. The weld profile is photographed using a stereo microscope, and its size is measured using a toolmaker's microscope. Each sample is further analyzed for surface hardness, corrosion potential and corrosion current density of the resultant weld.

Table 2 shows the depth, width, D/W ratio, surface hardness, corrosion potential and corrosion current density of each weld in Sample A1-A4 described. The depth of weld indicates the maximal depth perpendicular to the weld surface. The width is the maximal horizontal width of the weld surface. The D/W ratio of weld is the value of the depth divided by the width.

TABLE 2

The results of analysis of Samples A1-A4

| Sample No. | Depth (mm) | Width (mm) | D/W Ratio | Surface Hardness (Hv) | Corrosion Potential (V) | Corrosion Current Density (A/cm$^2$) |
|---|---|---|---|---|---|---|
| A1 | 2.21 | 9.60 | 0.23 | 179 | −0.63 | 4.36 × 10$^{-5}$ |
| A2 | 2.84 | 8.84 | 0.32 | 326 | −0.99 | 7.89 × 10$^{-5}$ |
| A3 | 6.48 | 6.01 | 1.08 | 186 | −0.51 | 3.97 × 10$^{-5}$ |
| A4 | 5.81 | 6.39 | 0.90 | 234 | −0.65 | 4.54 × 10$^{-5}$ |

FIGS. 4-7 show cross sectional views of the samples in Samples A1-A4. As can be seen in the figures, the welds of Samples A1 and A2 cannot completely penetrate the joint of the two workpieces, thus they are not suitable in practice. In contrast, the welds in Samples A3 and A4 completely penetrate the joint of the two workpieces, which comply with the basic requirement of welding.

According to the results provided above, when the welding is carried out without using any welding flux (i.e. Sample A1), the weld thus formed is shallow and wide. In the case that 100% SiC is used as the welding flux (i.e. Sample A2), though the surface hardness of the weld is increased, the weld D/W ratio decreases at the same time, with the decreased corrosion potential and increased corrosion current density. While the welding flux without SiC contained (i.e. Sample A3) is sufficient to form a deep, narrow weld, the surface hardness of the resultant weld still needs to be improved. Since the welding flux used for austenitic stainless steel of the present disclosure (i.e. Sample A4) includes the components set at the certain proportion, the surface hardness is significantly enhanced over those samples using no welding flux or using the conventional welding flux, while the corrosion resistance of the resultant does not significantly decrease.

(B) The Effect of the Proportion of the Components

In the series of experiments, the compositions of the welding fluxes in Samples B1-B5 are listed in Table 3. Samples B1, B4 and B5 contain the same components as the present disclosure, while the proportions of them are not within the claimed range. Samples B2 and B3 represent the welding flux used for austenitic stainless steel of the present disclosure. The welding conditions are set the same as in the experiment series (A) above.

TABLE 3

The composition of the welding flux in Samples B1-B5

| Sample | wt. % of each component | | | | | |
|---|---|---|---|---|---|---|
| No. | SiC | SiO$_2$ | MoO$_3$ | TiO$_2$ | NiO | MgO |
| B1 | 15 | 30 | 25 | 15 | 10 | 5 |
| B2 | 25 | 30 | 20 | 15 | 5 | 5 |
| B3 | 40 | 25 | 15 | 10 | 5 | 5 |
| B4 | 50 | 20 | 15 | 5 | 5 | 5 |
| B5 | 65 | 10 | 10 | 5 | 5 | 5 |

Table 4 below shows the depth, width, D/W ratio, surface hardness, corrosion potential and corrosion current density of each weld in Samples B1-B5. The definitions of depth, width and D/W ratio are the same as the experiment series (A) above.

TABLE 4

The results of analysis of Samples B1-B5

| Sample No. | Depth (mm) | Width (mm) | D/W Ratio | Surface Hardness (Hv) | Corrosion Potential (V) | Corrosion Current Density (A/cm$^2$) |
|---|---|---|---|---|---|---|
| B1 | 5.92 | 6.31 | 0.94 | 193 | −0.59 | 4.11 × 10$^{-5}$ |
| B2 | 5.81 | 6.39 | 0.90 | 234 | −0.65 | 4.54 × 10$^{-5}$ |
| B3 | 5.27 | 6.46 | 0.82 | 260 | −0.70 | 5.91 × 10$^{-5}$ |
| B4 | 4.60 | 6.41 | 0.72 | 262 | −0.74 | 6.16 × 10$^{-5}$ |
| B5 | 4.33 | 6.78 | 0.64 | 272 | −0.88 | 7.12 × 10$^{-5}$ |

According to the above results, it is clear that when the content of SiC in the welding flux does not reach the weight ratio of 20-40% (i.e. Sample B1), the surface hardness of the weld is significantly lower than those within the claimed range of the present disclosure (i.e. Samples B2 and B3). Such a low surface hardness of the weld in Sample B1 shows inadequate abrasion resistance. In the case that the content of SiC exceeds the claimed range of the present disclosure (i.e. Samples B5), the joint penetration is insufficient, and the corrosion resistance is also reduced. Furthermore, Sample B4 has the contents of all the components set within the claimed range of the present disclosure, except for the content of SiC. However, the content of SiC in Sample B4 exceeds the claimed range, the weld depth is only 4.60 mm, while the surface hardness of the resultant weld is not significantly improved, and the weld D/W ratio drops dramatically.

Hence, it can be proved that since the present disclosure uses these components set at the certain proportion, the surface hardness of the weld formed can be dramatically increased without affecting the joint penetration and weld D/W ratio, thus providing the weld with excellent abrasion resistance. Meanwhile, the corrosion resistance of the weld is still remained without being significantly affected.

In summary, since the welding flux used for austenitic stainless steel of the present disclosure contains SiC in combination with $SiO_2$, $MoO_3$, $TiO_2$, NiO and MgO, the D/W ratio and surface hardness of the weld can be consequently improved, thus reducing angular deformation of the weldment and enhancing abrasion resistance of the weld.

Since SiC, $SiO_2$, $MoO_3$, $TiO_2$, NiO and MgO contained in the welding flux used for austenitic stainless steel are set at the certain proportion, the surface hardness of the weld can be increased while maintaining the joint penetration and corrosion resistance of the resultant weld, thus improving the welding quality.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A welding flux used for austenitic stainless steel, comprising: 20-40 wt. % SiC, 20-30 wt. % $SiO_2$, 15-25 wt. % $MoO_3$, 2-15 wt. % $TiO_2$, 2-10 wt. % NiO and 1-5 wt. % MgO.

2. The welding flux used for austenitic stainless steel as claimed in claim 1, wherein the SiC is in the form of particles, with a size of each of said particles is 20-40 nm.

* * * * *